United States Patent [19]

Scholz

[11] Patent Number: 4,971,496

[45] Date of Patent: Nov. 20, 1990

[54] NON-METALLIC ACOUSTIC AND THERMAL ISOLATING FASTENER MOUNT

[75] Inventor: Karen J. Scholz, Kent, Wash.

[73] Assignee: The Boeing Company, Seattle, Wash.

[21] Appl. No.: 262,488

[22] Filed: Oct. 25, 1988

[51] Int. Cl.⁵ .............................................. F16B 39/00
[52] U.S. Cl. ..................................... 411/105; 411/965;
 411/907; 411/302; 411/108; 52/144; 52/787
[58] Field of Search ............... 411/103, 105, 108, 112,
 411/302, 182, 907, 908, 947, 965, 970; 52/403,
 144, 145, 126.5, 126.6, 787; 244/129.1, 132

[56] References Cited

U.S. PATENT DOCUMENTS

| | | | |
|---|---|---|---|
| 2,706,315 | 4/1955 | Price | 52/144 X |
| 3,041,912 | 7/1962 | Kreider et al. | 52/787 |
| 3,176,747 | 4/1965 | Nenzell | 411/103 |
| 3,318,622 | 5/1967 | Crumpler | 411/965 X |
| 3,524,489 | 8/1970 | King, Jr. | 411/103 |
| 3,700,020 | 10/1972 | Wallace | 411/965 X |
| 4,227,561 | 10/1980 | Molina | 411/103 |
| 4,285,380 | 8/1981 | Gulistan | 411/103 |
| 4,296,586 | 10/1981 | Heurteux | 52/787 |
| 4,310,273 | 1/1982 | Kirrish | 411/907 X |
| 4,399,642 | 8/1983 | Bard et al. | 52/787 X |
| 4,437,542 | 3/1984 | Yeager et al. | 52/144 X |
| 4,464,091 | 8/1984 | Molina | 411/105 |
| 4,768,907 | 9/1988 | Gauron | 411/85 |
| 4,812,193 | 3/1989 | Gauron | 411/82 X |

Primary Examiner—Robert L. Wolfe
Assistant Examiner—Suzanne L. Dino
Attorney, Agent, or Firm—Christensen, O'Connor, Johnson & Kindness

[57] ABSTRACT

A non-metallic acoustic and thermal isolating fastener mount comprising a housing 20, a threaded locking plate 30, an elastic diaphragm 40, and an unthreaded spacer 50 is disclosed. The housing 20 includes a cavity 24 and a pair of outwardly extending arms 22. Mounted in the cavity 24 is the treaded locking plate 30. The treaded locking plate 30 is positioned such that a pair of posts 34 lie between a pair of outwardly extending arms 29 of an access opening 26 formed in the top of the housing 20. The elastic diaphragm surrounds the access opening and includes apertures through which a threaded hub 32 and the posts 34 extend. The unthreaded spacer 50 includes a hub having outer diameter that allows it to be press-fit around the hub 32 of the threaded locking plate 30. The housing 20, threaded locking plate 30, and spacer 50 are formed of a high-strength, high-temperature plastic, preferably a fiber reinforced polyamide-imide resin, such as Torlon ™.

26 Claims, 2 Drawing Sheets

NON-METALLIC ACOUSTIC AND THERMAL ISOLATING FASTENER MOUNT

FIELD OF THE INVENTION

The present invention relates to fastener mounts and, more particularly, to non-metallic fastner mounts for receiving fastener elements that coact to connect together surfaces such that the surfaces are acoustically and thermally isolated.

BACKGROUND OF THE INVENTION

The airline industry has long used fasteners to mount passenger cabin trim panels to the airplane's fuselage structure. The fasteners that are used in this environment usually include a fastener element, such as a machine screw, and a fastener mount that is attached to a support member. Such fasteners are required to securely hold the trim panels in place, while also acoustically and thermally isolating the trim panel from the fuselage. Without proper acoustic isolation, a great deal of noise is transmitted into the passenger cabin. Without proper thermal isolation, a significant amount of heat is lost at the fastening point.

In the past, many prior aircraft trim panel fastener mounts have been constructed of aluminum or steel elements joined by a large, resilient, thick washer-shaped pad. The large, resilient, thick washer-shaped pad provided the desired acoustic and thermal isolation while the aluminum or steel elements provided the desired structural attachment strength. In this regard, the specifications for trim panel fastener mounts require that such mounts meet certain load requirements. While the load requirements vary depending upon the location of a fastener mount during use, the minimum requirements are that a fastener mount designed to receive a 0.1900 inch diameter, 32 UNF threads per inches screw inserted to a depth of 0.240 inches withstand the application of a load of 40 pounds in tension and shear to the screw without failure, i.e., separation between the screw and the fastener mount. Other fastener mounts are required to meet more than five times these tension and shear loads, i.e., tension and shear loads of up to 200 pounds for the same size screw.

The major disadvantages of prior art aircraft trim panel fastener mounts are cost and weight. The metal components of such mounts are usually machined, which is an expensive process. Further, the design of prior art aircraft trim panel fastener mounts is such that metal subparts have to be assembled and swaged together—a labor intensive and, thus, expensive process. Prior art aircraft trim panel fastener mounts are undesirably heavy because they are, in part, formed of heavy materials, namely aluminum or steel. The weight of prior fasteners is of major concern in airplane design because each item that adds structural weight to an aircraft causes a corresponding decrease in payload weight.

SUMMARY OF THE INVENTION

In accordance with this invention, an acoustic and thermal isolating fastener mount that overcomes a number of the limitations of prior fasteners is provided. The fastener mount of the present invention comprises a non-metallic housing that includes at least one flange. The housing also includes a cavity having an access opening formed in a wall that is remote from, but lies parallel to, the flange. A non-metallic threaded locking plate is mounted in the cavity. The locking plate includes a flat plate and a threaded hub that extends through the access opening. While the non-metalllic housing can be formed of various non-metallic, i.e., plastic materials, the chosen material should be moldable by any suitable molding process, such as injection molding, vacuum molding, blow molding, etc. In addition to being moldable, the non-metallic threaded locking plate must be capable of meeting the same load requirements as prior art metallic fastener mounts. More specifically, the threaded locking plate of a fastener mount formed in accordance with this invention must be capable of withstanding, without failure, screw shear and tension loads of up to 200 pounds applied to a 0.1900 inch diameter, 32 UNF threads per inch screw inserted to a depth of 0.240 inches. One suitable plastic material that meets this requirement is a fiber reinforced polyaminde-imide resin manufactured by Amoco Performance Products, Inc., Ridgefield, Conn. under the tradmark Torlon. Preferably, because of its high strength, the same material is used to form the non-metallic housing. The fastener further comprises a ring of isolating material mounted in the access opening for acoustically and thermally isolating the housing from the threaded locking plate. In a preferred embodiment of the present invention, the ring of isolating material is formed by an elastic diaphragm that may be bonded to the edge of the access opening of the housing. As a result, when the flange is attached to a first surface and a threaded fastener attaches a second surface to the locking plate, the first and second surfaces are thermally and acoustically isolated from one another.

In accordance with further aspects of this invention, the fastener also includes a non-metallic unthreaded spacer. The unthreaded spacer comprises a flat plate and an unthreaded hub that protrudes outwardly from one surface of the flat plate. The unthreaded hub includes a central aperture that surrounds and frictionally engages the outer surface of the threaded hub of the threaded locking plate. Preferably, the hub frictional engagement is such that the non-metallic unthreaded spacer and the threaded locking plate can be manually press-fit together. Also preferably, the non-metallic unthreaded spacer is formed of the same material as the threaded locking plate, e.g., Torlon ™.

In accordance with other aspects of this invention, the fastener includes a mechanism for restricting the rotation of the threaded locking plate with respect to the housing. The preferred form of the mechanism for restricting rotation comprises at least one post affixed to the threaded locking plate and located alongside the threaded hub, and at least one arm that extends outwardly from the access opening of the housing, the arm positioned and sized to receive the post of the threaded locking plate.

As will be readily appreciated by those skilled in this art and others from the foregoing description, the present invention provides a fastener mount that is ideally suited for use in mounting passenger cabin trim panels to an airplane's fuselage. The fastener mount overcomes the problems of prior art fastener mounts because it: (1) can be quickly and economically assembled; (2) provides acoustic and thermal isolation between the trim panels and the fuselage, while securely holding the panels in place; and, (3) is of lightweight construction, thus allowing greater fuel efficiency and/or increased airplane payload.

It is to be understood, of course, that while fasteners formed in accordance with the present invention were designed for use in aircraft, they are also suitable for use in other environments, particularly other environments where cost and weight are of concern.

BRIEF DESCRIPTION OF THE DRAWINGS

The foregoing, and other features and advantages of the present invention, will become more readily appreciated as the same becomes better understood from the following description of a preferred embodiment of the invention when taken in conjunction with the accompanying drawings, wherein.

DETAILED DESCRIPTION OF THE PREFERRED EMBODIMENT

Figure 1:
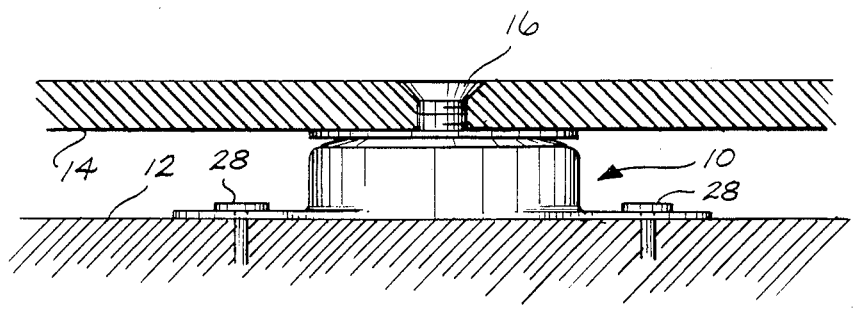
FIG. 1 is a side view of a non-metallic acoustic and thermal isolating fastener mount formed in accordance with this invention.

FIG. 1 illustrates a non-metallic acoustic and thermal isolating fastener mount 10 formed in accordance with the invention for connecting a first surface 12, such as a structural element of an aircraft fuselage, to a second surface 14, such as a passenger cabin trim panel. As more fully described below, the fastener mount 10 is connected to the first surface 12 through the use of rivets 28 or any other conventional means of attachment. The second surface 14 is attached to the fastener mount 10 by means of a mounting screw 16.

Figure 2:
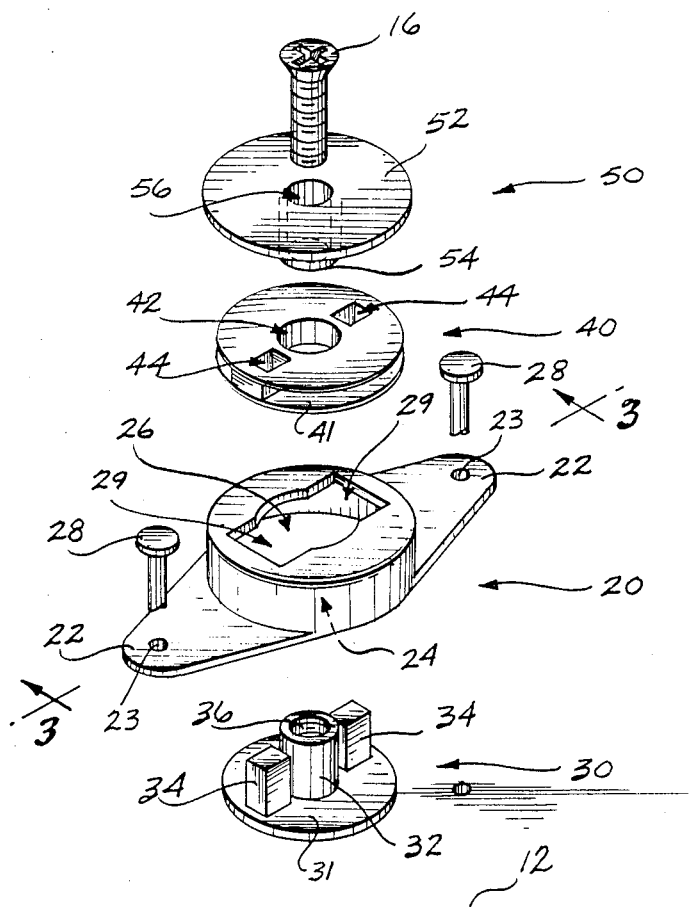
FIG. 2 is an exploded view of the non-metallic acoustic and thermal isolating fastener mount illustrated in FIG. 1.

An exploded view of the subparts of the fastener mount 10 is shown in FIG. 2. As shown there, the fastener mount 10 comprises: a non-metallic housing 20; a non-metallic threaded locking plate 30; an elastic diaphragm 40; and, a non-metallic unthreaded spacer 50.

The housing 20 is generally cylindrical and includes an open end and a closed end. A pair of flanges 22, suitable for permanent attachment to the first surface 12, protrude orthogonally outward from the open end of the housing 20. The housing 20 defines a cavity 24 having an access 26 located in the closed end, i.e., the end remote from the flanges 22. The access opening is generally cylindrical and includes a pair of outwardly extending, opposed arms 29. Permanent attachment of the housing 20 to the first surface 12 is accomplished through the use of rivets 28, or any other standard means of attachment, extending through holes 23 formed in the flanges 22 and the first surface 12.

The threaded locking plate 30 is mounted inside the cavity 24 of the housing 20. The threading locking plate 30 includes a cylindrical plate 31 and a threaded hub 32 having internal threads 36 suitable for receiving the mounting screw 16. The threaded locking plate 30 also includes a pair of posts 34 that protrude outwardly from the same face of the cylindrical plate 31 as the threaded hub 32. The posts 34 are located on opposite side of the threaded hub 32. The posts 34 and the arm 29 of the access opening 26 coact to restrict rotation of the threaded locking plate 30. More specifically, the arms 29 are postioned and sized to receive the posts 34 of the threaded locking plate 30. As a result, when a rotational force is applied to the threaded locking plate 30 by the mounting screw 16, the threaded locking plate 30 rotates until the posts 34 are stopped by the arms 29. When this occurs, rotation of the threaded locking plate 30 stops.

The elastic diaphragm 40, which provides acoustic and thermal isolation between the first surface 12 and the second surface 14, is flat and cylindrically shaped. Located about the periphery of the elastic diaphragm 40 is an indentation 41 that is sized and shaped to mate with the edges of the access opening 26. Though not required, it is often desirable to attach the elastic diaphragm 40 through conventional bonding techniques to the edge of the access opening 26. The elastic diaphragm 40 includes a central opening 42 sized to accommodate the threaded hub 32 of the threaded locking plate 30 and the unthreaded hub 45 of the unthreaded spacer 50 (described below), when these items are joined together (also described below). The elastic diaphragm 40 also includes one or more post openings 44 sized to accommodate the anti-rotation posts 34 of the threaded locking plate 30.

Figure 3:
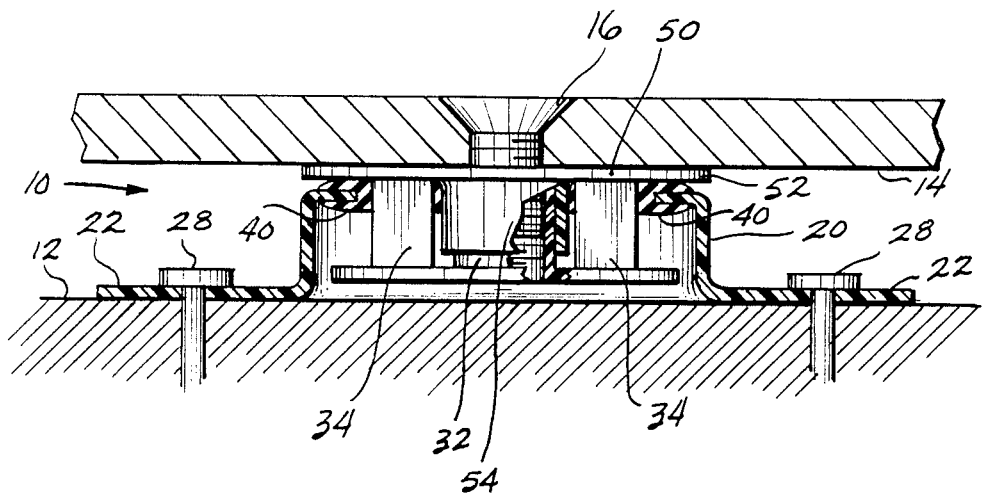
FIG. 3 is a cross-sectional view of the non-metallic acoustic and thermal isolating fastener mount illustrated in FIGS. 1 and 2, taken along 3—3 of FIG. 2.

The unthreaded spacer 50 includes a flat plate 52 and an unthreaded hub 54 that protrudes outwardly from one surface of the flat plate 52. The other surface of the flat plate 52 rests against the second surface 14, illustrated best in FIG. 3. The unthreaded hub 54 of the unthreaded spacer 50 includes a central aperture 56 sized to surround and frictionally engage the outer surface of the threaded hub 32 of the threaded locking plate 30. Preferably, the frictional engagement is such that the hubs of the unthreaded spacer and the threaded locking plate can be manually press-fit together.

As noted above, the housing 20, threaded locking plate 30, and unthreaded spacer 50 are constructed of a non-metallic material, namely, a high-strength, high-temperature plastic. Because of its high-strength and lightweight properties, and its capacity to adequately hold threads, a plastic sold under the trademark Torlon and available from Amoco Performance Products, Inc., Ridgefield, Conn. is presently the most preferred. Torlon is a moldable, fiber reinforced polyamide-imide resin that has the capability of meeting the structural requirements of prior art aircraft passenger cabin trim panel mounts. Among these requirements is the ability to, without failure, withstand a load of 200 pounds in both tension and shear applied to a 0.1900 inch diameter, 32 UNF threads per inch screw inserted to a depth of 0.240 inches. Plastics, such as nylon and the like, commonly used to form inserts for receiving screws do not meet this requirement. The elastic diaphragm 40 may be constructed of any natural or synthetic rubber, or any highly elastomeric plastic that provides the desired amount of acoustic and/or thermal isolation.

Plastic construction of the subparts of the fastener 10 allows the threaded locking plate 30 and the unthreaded spacer 50 to be manually press-fit together. This allows the entire fastener 10 to be pre-assembled before installation. Further, it eliminates the need for swaging the subparts together on assembly, as is required when prior fasteners formed of metal are assembled.

While a preferred embodiment of the invention has been illustrated and described, it should be understood that variations can be made therein without departing from the spirit and scope of the invention. For example, a single post and arm anti-rotation mechanism can be used, if desired. Or an entirely different anti-rotation mechanism can be used. Further, a single attachment flange, or more than two attachment flanges, can be used. Accordingly, it is to be understood that the invention is not to be limited to the specific embodiment illustrated and described. Rather, the true scope and spirit of the invention is to be determined by reference to the following claims.

The embodiments of the invention in which an exclusive property or privilege is claimed are defined as follows:

1. An acoustic and thermal isolating fastener mount for attaching a first surface to a spaced-apart second surface to provide acoustic and thermal isolation therebetween, said fastener mount comprising:
   a non-metallic housing including at least one flange suitable for permanent attachment to a first surface such that said housing protrudes outwardly from said first surface, said housing including a cavity having an access opening remote from said at least one flange and, thus, spaced away from said first surface when said at least one flange is attached to said first surface;
   a non-metallic threaded locking plate mounted in said cavity, said threaded locking plate including a threaded hub facing said access opening and suitable for receiving a mounting screw that first enters said housing via said access opening, said housing access opening and said threaded locking plate including means for restricting the rotation of said threaded locking plate with respect to said housing; and,
   isolating means positioned between said housing and said threaded locking plate for acoustically and thermally isolating said housing from said threaded locking plate.

2. An acoustic and thermal isolating fastener amount as claimed in claim 1, wherein said non-metallic threaded locking plate is formed of a moldable fiber reinforced polyamide-imide resin.

3. An acoustic and thermal isolating fastner mount as claimed in claim 1, wherein said non-metallic threaded locking is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

4. An acoustic and thermal isolating fastener mount as claimed in claim 1, wherein said isolating means is mounted in said access opening of said cavity and surrounds said threaded hub of said threaded locking plate.

5. An acoustic and thermal isolating fastener mount as claimed in claim 4, wherein said non-metallic threaded locking plate is formed of a moldable fiber reinforced polyamide-imide resin.

6. An acoustic and thermal isolating fastener mount as claimed in claim 4, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

7. An acoustic and thermal isolating fastener mount as claimed in claim 4, wherein said isolating means comprises an elastic diaphragm bonded to the edge of said access opening of said cavity.

8. An acoustic and thermal isolating fastener mount as claimed in claim 7, wherein said non-metallic threaded locking plate is formed of a moldable fiber reinforced polyamide-imide resin.

9. An acoustic and thermal isolating fastener mount as claimed in claim 7, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

10. An acoustic and thermal isolating fastener mount as claimed in claim 1, further comprising a non-metallic unthreaded spacer, said unthreaded spacer including a flat plate and a hub that protrudes outwardly from one surface of said flat plate, said hub of said unthreaded spacer including a central aperture that surrounds and fictionally engages the outer surface of said threaded hub of said threaded locking plate.

11. An acoustic and thermal isolating fastener amount as claimed in claim 10, wherein said non-metallic threaded locking plate is formed of a moldable filter reinforced polyamide-imide resin.

12. An acoustic and thermal isolating fastener mount as claimed in claim 10, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

13. An acoustic and thermal isolating fastener mount as claimed in claim 10, wherein said isolating means is mounted in said access opening of said cavity and surrounds said threaded hub of said threaded locking plate.

14. An acoustic and thermal isolating fastener mount as claimed in claim 13, wherein said non-metallic threaded locking plate is formed of a moldable fiber reinforced polyamide-imide resin.

15. An acoustic and thermal isolating fastener mount as claimed in claim 13, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

16. An acoustic and thermal isolating fastener mount as claimed in claim 13, wherein said isolating means comprises an elastic diaphragm bonded to the edge of said access opening of said cavity.

17. An acoustic and thermal isolating fastener mount as claimed in claim 1, wherein said means for restricting the rotation of said threaded locking plate with respect to said housing comprises at least one post affixed to said threaded locking plate alongside said threaded hub and at least one arm that extends outwardly from the center of said access opening of said cavity through which said threaded hub extends, said at least one arm positioned and sized to receive said at least one post.

18. An acoustic and thermal isolating fastener mount as claimed in claim 17, wherein said non-metallic threaded locking plate is formed of a moldable fiber reinforced polyamide-imide resin.

19. An acoustic and thermal isolation fastener mount as claimed in claim 17, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

20. An acoustic and theremal isolating fastener mount as claimed in claim 17, wherein said isolating means is mounted in said access opening of said cavity and surrounds said threaded hub of said threaded locking plate.

21. An acoustic and thermal isolating fastener mount as claimed in claim 20, wherein said non-metallic threaded locking plate is formed of a moldable fiber reinforced polyamide-imide resin.

22. An acoustic and thermal isolating fastener mount as claimed in claim 20, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

23. An acoustic and thermal isolating fastener mount as claimed in claim 20, wherein said isolating means comprises an elastic diaphragm bonded to the edge of said access opening of said cavity.

24. An acoustic and thermal isolating fastener mount as claimed in claim 20, further comprising a non-metallic unthreaded spacer, said unthreaded spacer including a flat plate and a hub that produces outwardly from one surface of said flat plate, said hub of said unthreaded spacer including a central aperture that surrounds and frictionally engages the outer surface of said threaded hub of said threaded locking plate.

25. An acoustic and thermal isolating fastener mount as claimed in claim 24, wherein said non-metallic threaded locking plate is formed of a moldable fiber reinforced polyamide-imide resin.

26. An acoustic and thermal isolating fastener mount as claimed in claim 24, wherein said non-metallic threaded locking plate is formed of a lighweight, high-strength non-metallic material capable of withstanding, without failure, a load of at least 200 pounds in both tension and shear applied to a 0.1900 inch diameter, 32 UNF threads per inch screw inserted to a depth of 0.240 inches.

* * * * *

UNITED STATES PATENT AND TRADEMARK OFFICE
CERTIFICATE OF CORRECTION

PATENT NO. : 4,971,496

DATED : November 20, 1990

INVENTOR(S) : Karen J. Scholz

It is certified that error appears in the above-identified patent and that said Letters Patent is hereby corrected as shown below:

| Column | Line | Error |
| --- | --- | --- |
| [57] | 7 | Delete "treaded" and insert therefor --threaded-- |
| [57] | 8 | Delete "treaded" and insert therefor --threaded-- |
| 1 | 7 | Delete "fastner" and insert therefor --fastener-- |
| 2 | 18 | Delete "polyaminde" and insert therefor --polyamide-- |
| 2 | 20 | Delete "tradmark" and insert therefor --trademark-- |
| 3 | 46 | After "access" insert --opening-- |
| 3 | 53 | After "and" insert --into-- |
| 3 | 61 | Delete "side and insert therefor --sides-- |
| 3 | 62 | Delete "arm" and insert therefor --arms-- |
| 3 | 65 | Delete "postioned" and insert therefor --positioned-- |
| 4 | 15 | Delete "hub 45" and insert therefor --hub 54-- |
| 5 | 33 | Delete "amount" and insert therefor --mount-- |
| 5 | 37 | Delete "fastner" and insert therefor --fastener-- |
| 6 | 12 | Delete "fictionally" and insert therefor --frictionally- |
| 6 | 14 | Delete "amount" and insert therefor --amount-- |

UNITED STATES PATENT AND TRADEMARK OFFICE
CERTIFICATE OF CORRECTION

PATENT NO. : 4,971,496

DATED : November 20, 1990

INVENTOR(S) : Karen J. Scholz

It is certified that error appears in the above-identified patent and that said Letters Patent is hereby corrected as shown below:

Column 6, line 59 Delete "isolation" and insert therefor --isolating--.

line 67, Delete "theremal" and insert therefor--thermal--.

Signed and Sealed this

Thirteenth Day of October, 1992

Attest:

DOUGLAS B. COMER

*Attesting Officer*      *Acting Commissioner of Patents and Trademarks*